No. 754,113. PATENTED MAR. 8, 1904.
W. ASTFALCK.
HYDRAULIC APPARATUS.
APPLICATION FILED JUNE 20, 1902.
NO MODEL. 9 SHEETS—SHEET 5.

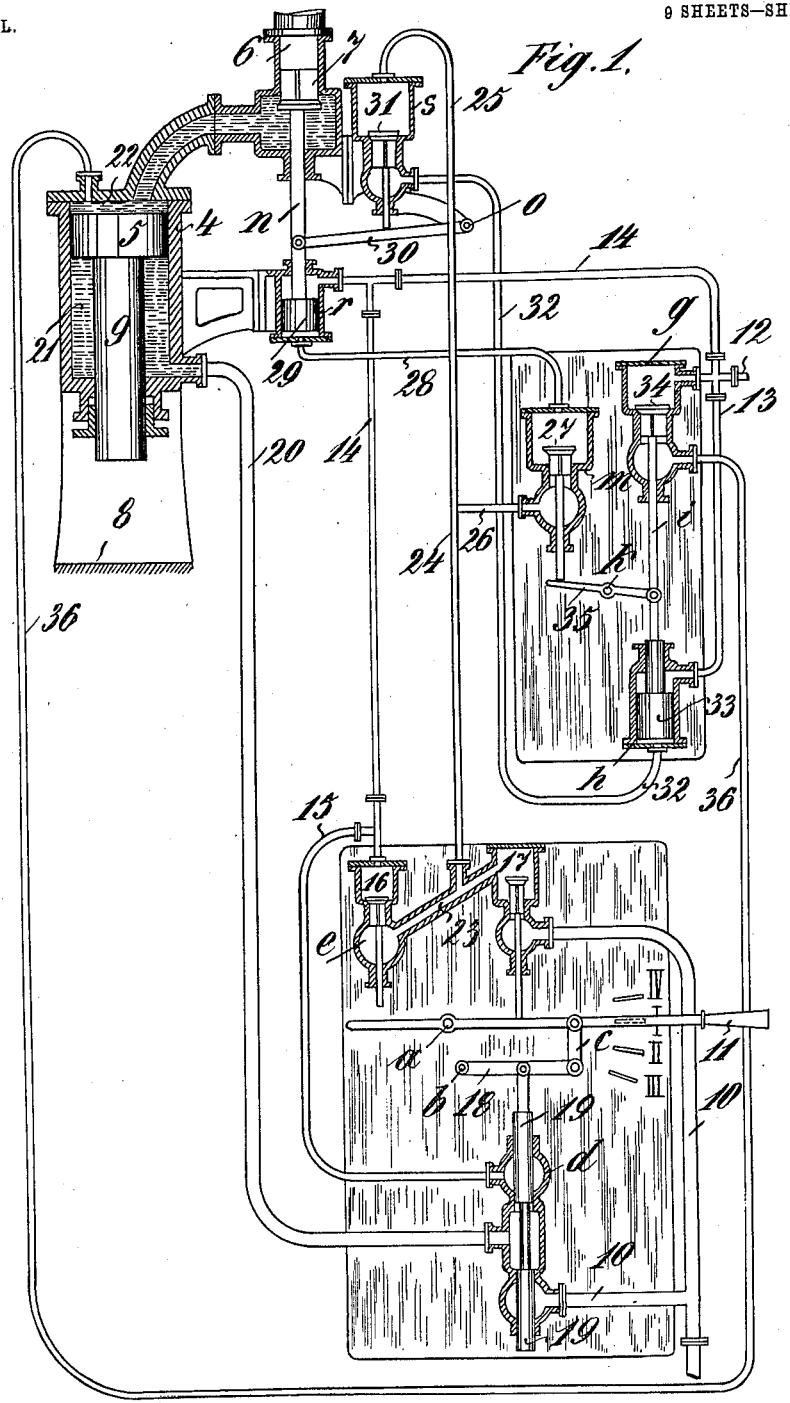

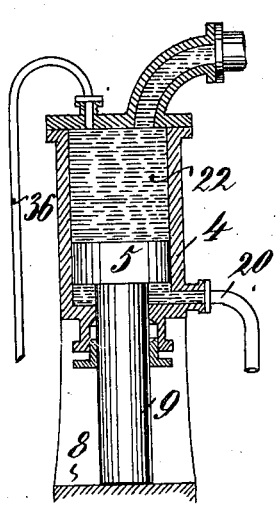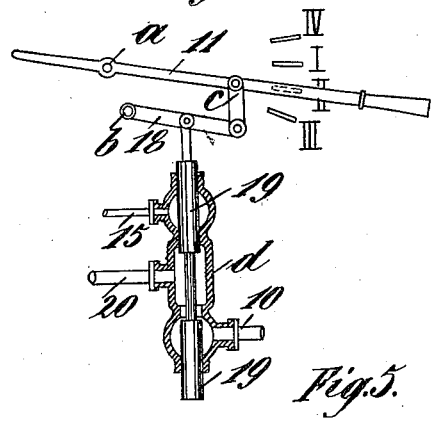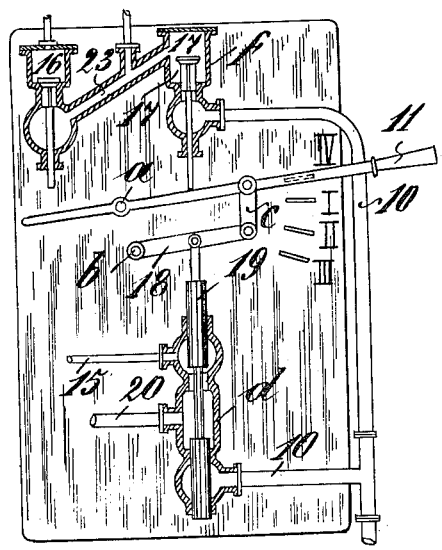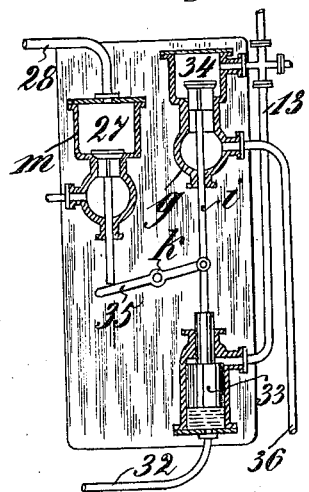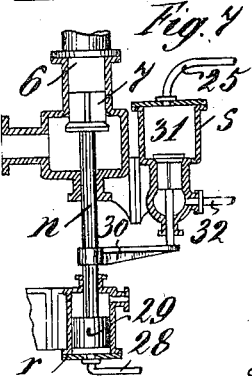

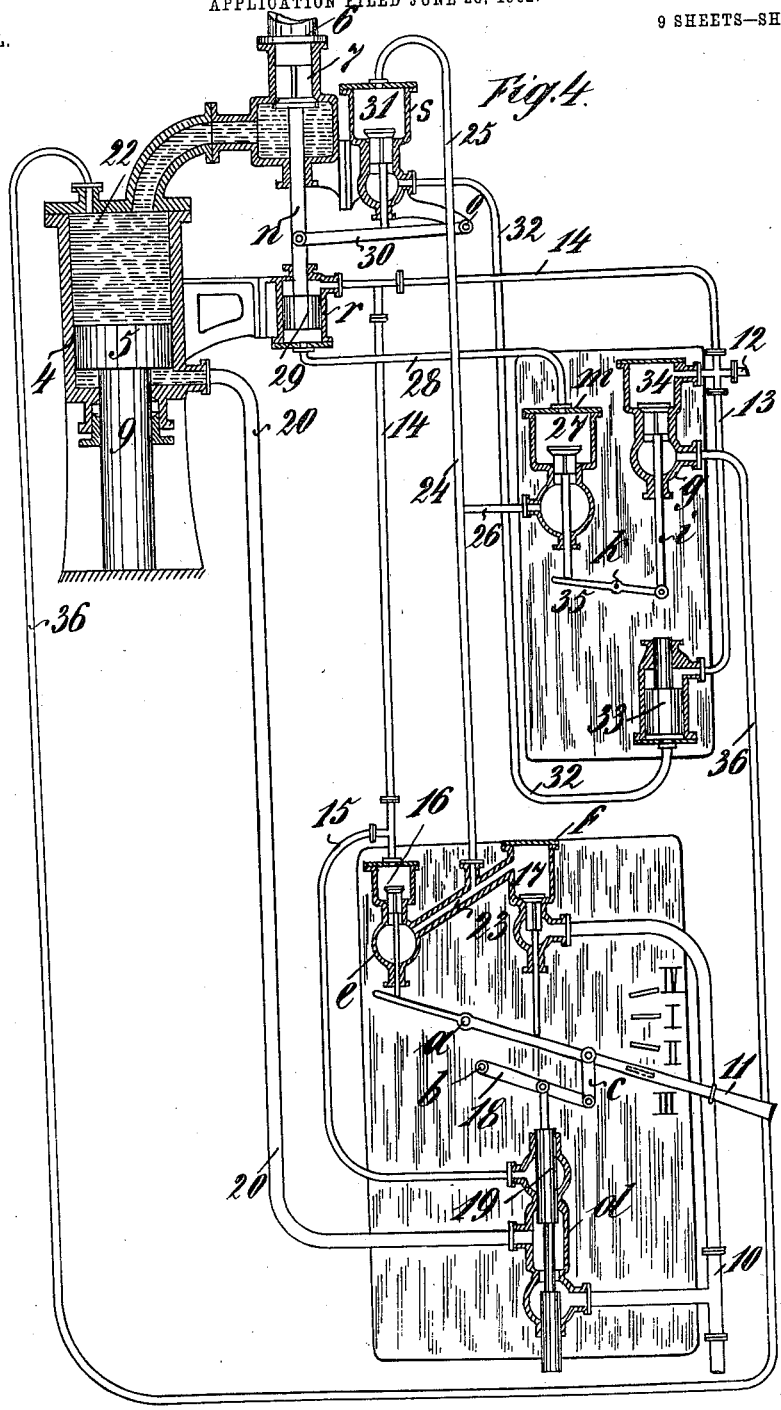

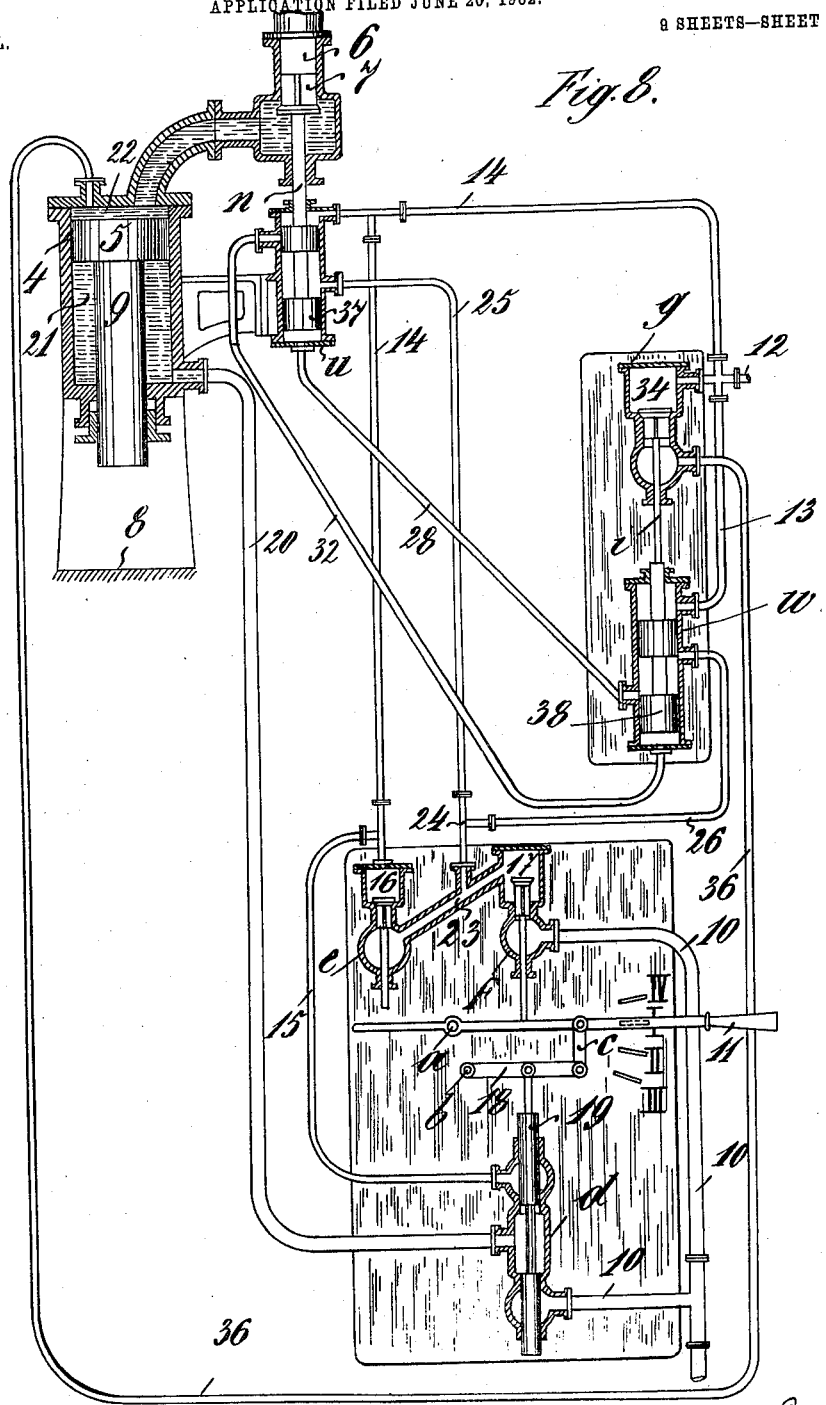

Witnesses:
Inventor:

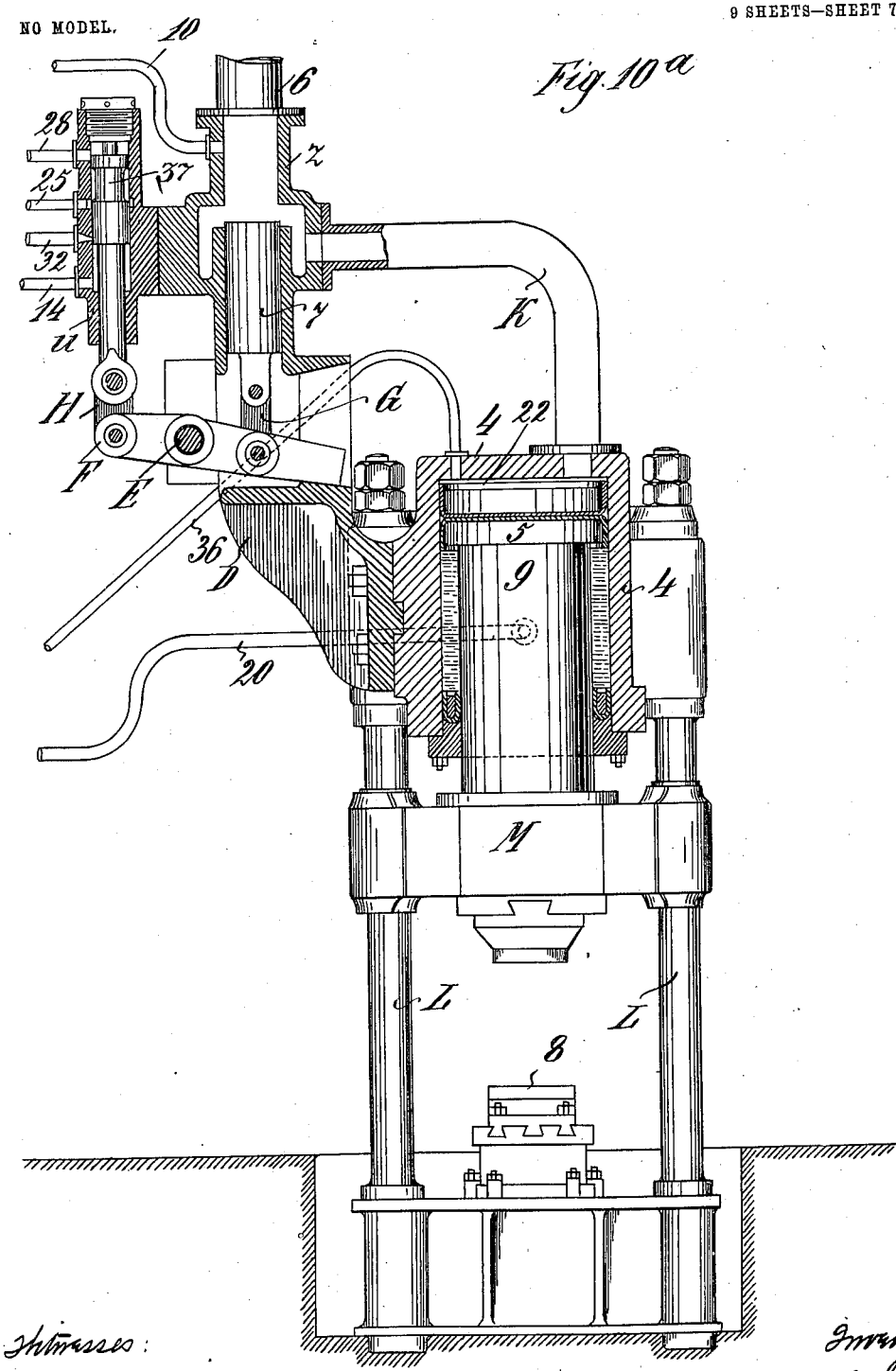

No. 754,113. PATENTED MAR. 8, 1904.
W. ASTFALCK.
HYDRAULIC APPARATUS.
APPLICATION FILED JUNE 20, 1902.
NO MODEL. 9 SHEETS—SHEET 8.

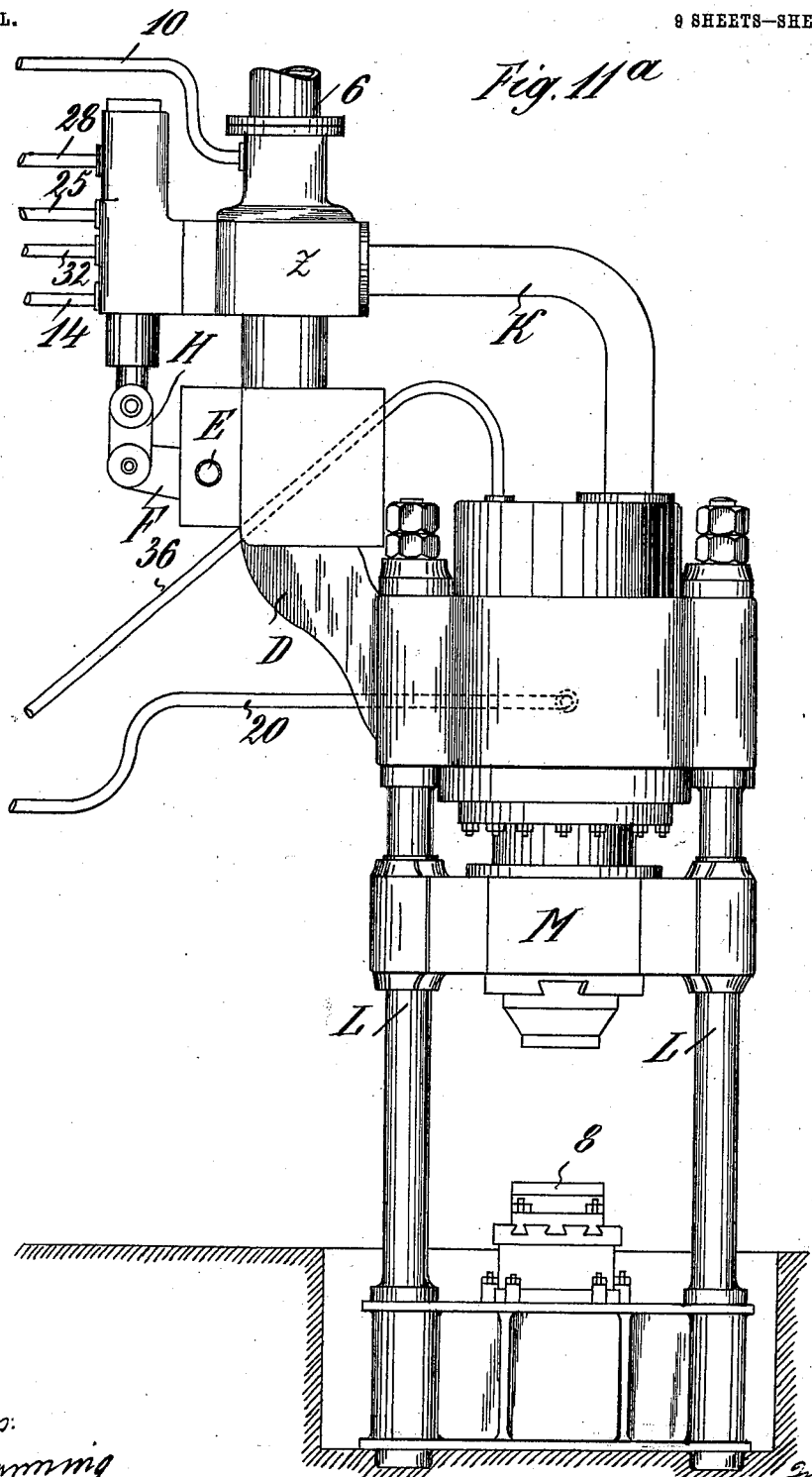

No. 754,113.

Patented March 8, 1904.

UNITED STATES PATENT OFFICE.

WILAND ASTFALCK, OF TEGEL, NEAR BERLIN, GERMANY.

HYDRAULIC APPARATUS.

SPECIFICATION forming part of Letters Patent No. 754,113, dated March 8, 1904.

Application filed June 20, 1902. Serial No. 112,549. (No model.)

*To all whom it may concern:*

Be it known that I, WILAND ASTFALCK, chief engineer, a subject of the King of Prussia, German Emperor, and a resident of Berlinerstrasse 92, Tegel, near Berlin, in the Kingdom of Prussia and Empire of Germany, have invented certain new and useful Improvements in Hydraulic Apparatus, of which the following is a specification.

The present invention relates to a new or improved apparatus for controlling hydraulic presses, shears, stamps, and other pressing devices.

The essential feature of the invention consists, on the one hand, in the particular arrangement of the controlling devices and the means for moving the same and, on the other hand, in the combination of the latter with the controlling devices, so as to result the fact that the filling of the cylinder with low-pressure water, the introduction of high-pressure water, and the exhaust of the cylinder take place in predetermined order and time and are initiated from a central position, and, further, that the cut-off or controlling device inserted in the low-pressure conduit and in the form of a valve, cock, or slide is positively driven in such a manner that it closes before the high-pressure conduit is opened to the pressure-space of the cylinder and, inversely, that it does not open until after the high-pressure conduit is closed to the pressure-space of the cylinder. By the latter feature of the invention the advantage is also obtained that the used pressure-water can be conducted through the special valve of the low-pressure conduit back into the latter and the piston or ram moved rapidly upward and downward. The various cut-off or controlling devices may be in the form of valves, cocks, or slides.

Figure 9:
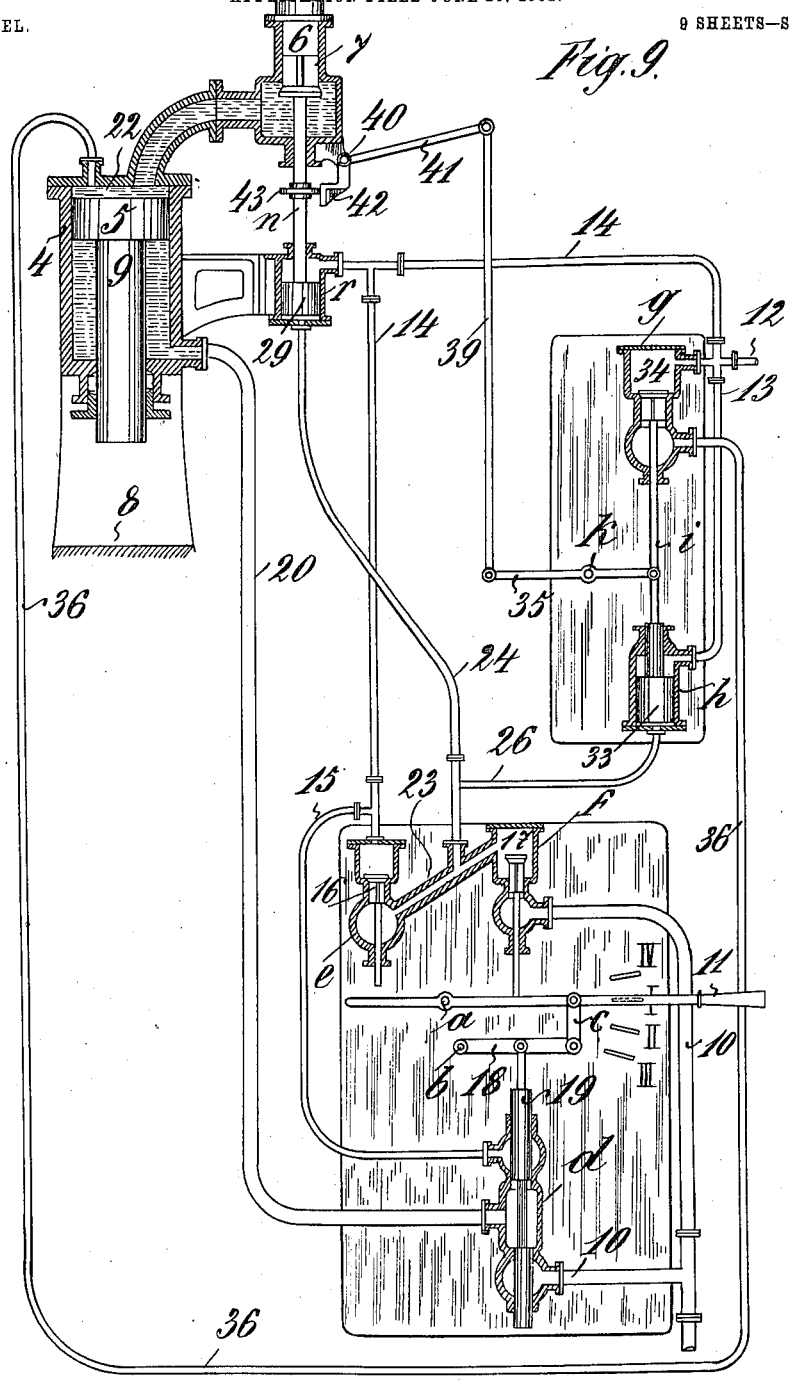

The annexed drawings represent several forms of the invention, Figures 1 to 6 illustrating diagrammatically and in section one form of the controlling apparatus in different working positions. Fig. 7 represents a modification of one part of the controlling mechanism. Figs. 8 and 9 represent diagrammatically and in section two other forms of construction, with some modifications in Figs. 10, 10ª, 11, and 11ª, of which the two former are vertical sections and the latter corresponding elevations. With a view to greater distinctness the details of construction and the packing of the valves or slides are not shown.

In all the forms of construction 4 represents the pressure-cylinder; 5, the piston; 6, the low-pressure conduit; 7, the cut-off device inserted in the latter; 8, the thrust-block for the working stamp 9; 10, the exhaust-conduit for the pressure-water used; 11, the controlling-lever, and 12 to 15 the conduit continuously filled with high-pressure water. Further, in all forms of construction the entire controlling mechanism consists of four parts or divisions—namely, the preliminary devices or valves moved prior to the movement of the remaining valves, devices for controlling the high-pressure conduit, devices for controlling the low-pressure conduit, and devices for initiating the descent and ascent of the piston and herein termed "return-controlling" devices.

In all forms of construction the preliminary and return control are arranged as follows: The lever 11, pivoted at $a$, is connected by a link $c$ with a lever 18, pivoted at $b$. By means of this lever 18 the lever 11 controls the cut-off device 19, placed in the chamber $d$, which represents part of the return-controlling devices or mechanism. The lever 11 also controls the two valves 16 and 17, of which the former is placed in a chamber $e$, the latter in a chamber $f$. These valve-chambers communicate with each other by a channel 23, into which the pipe 24 leads. The valve-chamber $e$ also communicates with the pipes 14 and 15, and the chamber $f$ communicates with the pipe 10. The chamber $d$ communicates on one hand with the pipes 15 and 20 and on the other hand with a branch of the pipe 10.

In the form of construction shown in Figs. 1 to 6 the controlling mechanism for the high-pressure pipes or high-pressure control comprises a valve 34, connected to the controlling-piston 33 and arranged in the chamber $g$. The latter communicates with the high-pressure pipes 12, 13, 14, and 36. The cylinder $h$ of the controlling-piston 33 communicates with the pipes 13 and 32. The rod $i$, connecting the valve 34 to the controlling-piston 33, is pivotally connected to a lever 35, fulcrumed at $k$, said lever 35 controlling a valve 27, placed in the chamber $m$. The latter communicates with the pipes 26 and 28.

In the form of construction under consideration the controlling-gear for the low-pressure pipe 6 or low-pressure control comprises the valve 7, before referred to, rigidly connected by a rod $n$ with a controlling-piston 29 and pivotally connected to a lever 30, fulcrumed at $o$. The cylinder $r$ of the said controlling-piston 29 communicates with the pipes 14 and 28. At the side of the low-pressure pipe a valve-chamber $s$ is arranged, communicating with the pipes 25 and 32, the valve 31 therein being controlled by the lever 30.

The controlling action with the form of controlling-gear shown in Figs. 1 to 6 is as follows: When the pressure-piston 5, with the stamp 9, is to be moved downward onto a piece of work (not shown in the drawings) placed on the block 8 and pressure is then to be exerted, the controlling-lever 11 is first moved into the position shown in Fig. 2. The valve 16 still remains closed and the valve 17 opened, although the latter has moved downward somewhat. On the other hand, the controlling device 19 will have moved into the position shown in Fig. 2, and the pipe 20 is thus put into communication with the exhaust-pipe 10, so that the pressure-water in the cylinder-space 21 can flow off through these pipes, and the pressure-piston moves downward into the position shown in Fig. 3. At the same time the cylinder-space 22 above the piston is filled with low-pressure water, owing to the valve 7 being open. If the controlling-lever is moved from position II to position III, as shown in Fig. 4, the controlling device 19 is moved still farther downward; but the pipes 20 and 10 remain, as before, in communication with each other. At the same time, however, the valve 17 is completely closed and the valve 16 opened. The high-pressure water now passes from the pipe 14 through the open valve 16, channel 23, pipes 24 and 26, open valve 27, and pipe 28 underneath the controlling-piston 29 and moves the latter, with the valve 7, into the position shown in Fig. 4, so that the low-pressure pipe 6 is shut off from the cylinder-space 22. At the same time the valve 31 has been opened by the upwardly-moved lever 30, so that the high-pressure water which has passed from the pipe 24 into the pipe 25 can pass through the valve 31 and pipe 32 to beneath the controlling-piston 33 and can move the latter, with the valve 34, upward into the position shown in Fig. 5. The lever 35 is thus at the same time so moved that the valve 27 is released and closes. The pressure-water now passes from the high-pressure pipe 12 through the valve 34 and the pipe 36 into the cylinder 22 in order to there perform the high-pressure work on the piston 5. If the piston is to be moved back again into the position shown in Fig. 1, the controlling-lever 11 is first moved back into position I, Fig. 1. The pipes 10 and 20 are thus shut off from each other. The valve 16 is also closed, but the valve 17 is opened. Since, however, the valve 31 is still open, the pipes 32, 25, and 24 are relieved of pressure, so that the controlling-piston 33 is moved downward by the pressure of water in the pipe 13, and the valve 34 is thereby closed. However, as the lever 35 moves with the connecting-rod $i$ the said lever opens the valve 27, so that the controlling-piston 29 is also relieved of pressure on its under side and is moved downward with the valve 7 by the high-pressure water in the pipe 14—that is to say, all the valves or controlling devices again assume the positions shown in Fig. 1. The lever is then moved from position I into position IV, as shown in Fig. 6. By this means the controlling device 19 is moved so far upward that the pipes 15 and 20 are placed in communication with each other, and the high-pressure water passes from the pipes 12, 14, and 15 through the pipe 20 into the cylinder-space 21 below the piston and moves the latter, as intended, back into the position shown in Fig. 1. At the same time the low-pressure water contained in the cylinder-space 22 is forced back into the low-pressure pipe 6 through the open valve 7. When this has taken place, the controlling-lever 11 is moved back into position I, by which means the pipe 20 is shut off from the pipe 15. The same operation can then be repeated.

Instead of the rocking lever 30 an arm 30 integral with the connecting-rod $n$ and extending under the valve 31 can be used, as shown in Fig. 7.

In the form of construction shown in Fig. 8 only the controlling mechanisms for the low-pressure and high-pressure systems is modified, a slide 37 being provided instead of the controlling-piston 29 and the valve 31, said slide being placed in the chamber $u$. The latter is in communication with the pipes 14, 32, 25, and 28. The slide 37 not only moves the valve 7, but at the same time controls the pipes 25 and 32. Instead of the controlling-piston 33 and the valve 27 a slide 38 is arranged in the chamber $w$, said slide 36 controlling the pipes 26 and 28, for which purpose the slide-chamber communicates both with these pipes and with the pipes 13 and 32. The action is the same as with the form shown in Figs. 1 to 6.

In the modification shown in Fig. 9 the valves 27 and 31 of Figs. 1 to 6 are dispensed with. The pipe 24 communicates directly with the cylinder $r$ of the controlling-piston 29, and the pipe 26 communicates with the cylinder $h$. The double-armed lever fulcrumed at $k$ is connected by a link 39 with a bell-crank lever 41 42, fulcrumed at 40. The shorter arm 42 of the bell-crank lever is hook-shaped, so that when the valve 7 is closed the said arm 42 extends under a projection or collar 43 on the valve-rod $n$ and does not release the valve 7 until the valve 34 is closed, or, vice versa, the valve 34 cannot be opened until the valve 7 has been closed. When the valve 7 is open, the arm 42 bears against the projection 43, so that a displacement of the controlling-piston 33 with the valve 34 is not possible. In this form of construction, therefore, the two valves 7 and 34 do not control each other by hydraulic means, but by mechanical means. The action of the controlling-gear as a whole is, however, the same as with the form shown in Figs. 1 to 6, so that it will be unnecessary to again describe it.

In the forms of construction shown in Figs. 1 to 9 the controlling device 19 is operated by means of the controlling-lever 11 with the aid of the link $c$ and levers 18. The operation of the controlling device by the controlling-lever can, however, obviously be effected by hydraulic means.

Figure 10:
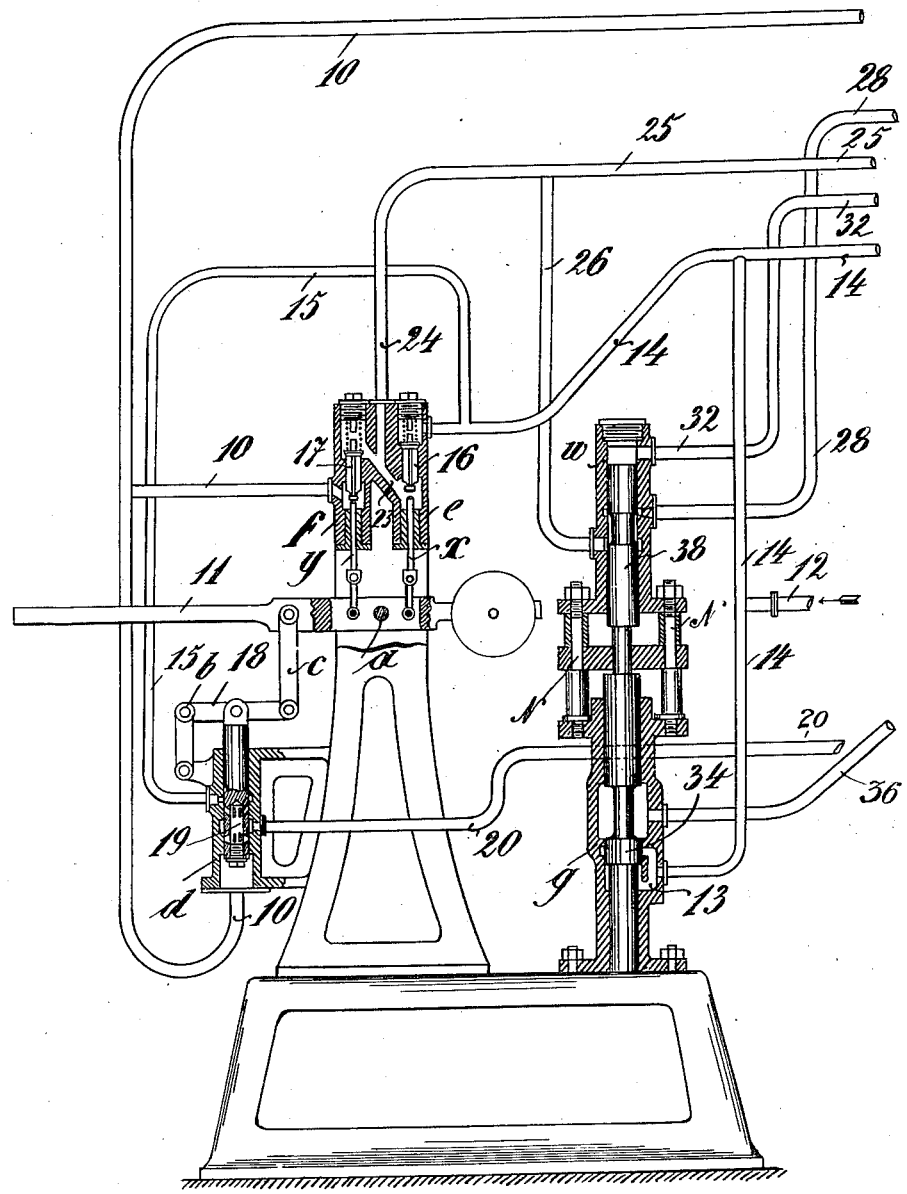
Figure 11:
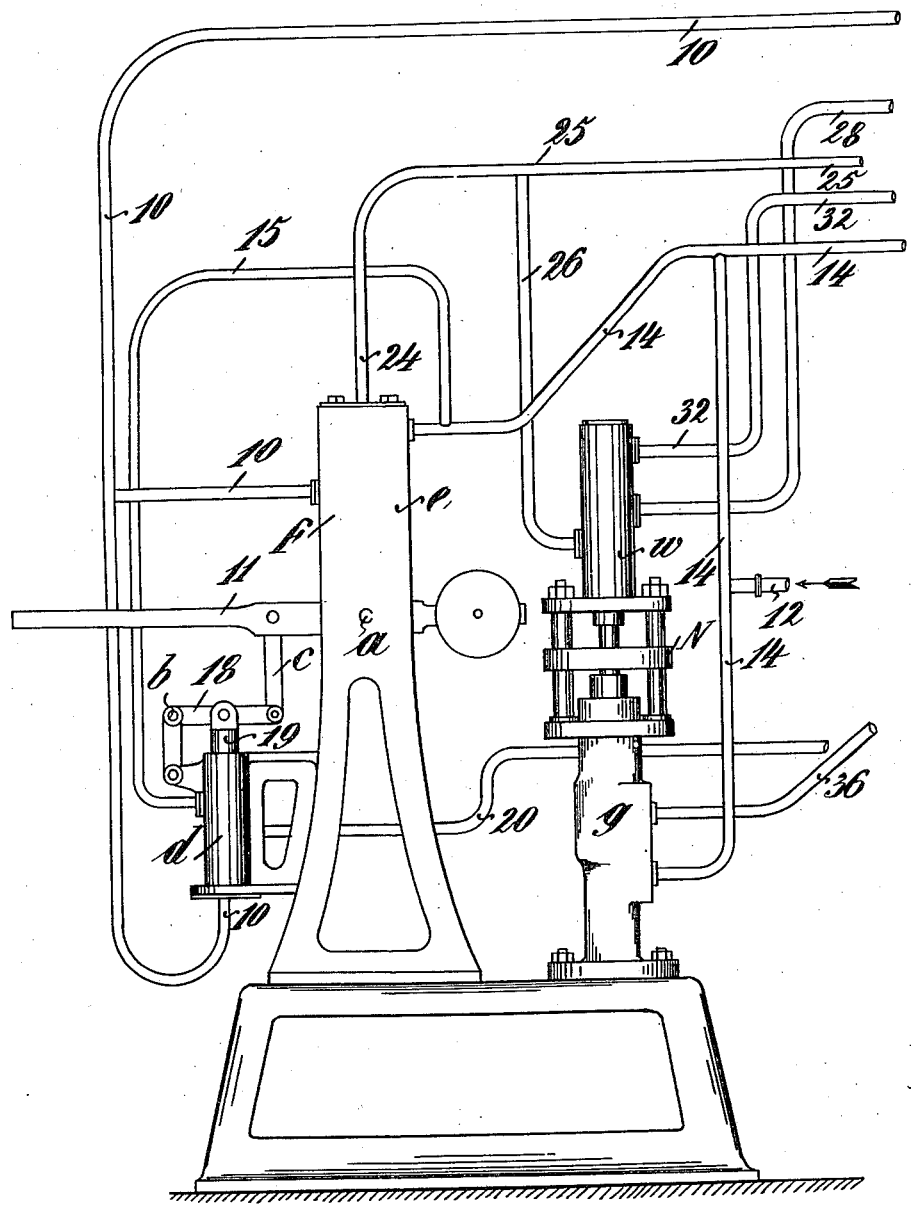

In the practical example illustrated in Figs. 10, 10$^a$, 11, and 11$^a$, which is similar to the construction shown in Fig. 8, the controlling-lever 11 is connected to two slides $x$ and $y$, moving in the valve-boxes $e$ and $f$, the said slides being situated below the valves 16 and 17. In place of the conical valve 7 a circular slide is arranged, and the latter is not directly but indirectly connected to the piston-slide 37. For this purpose the slide-box $z$, provided with a suitable bracket D, is secured to the pressure-cylinder 4, for instance, and provided with a double-armed lever F, pivoted at E, which is connected by means of suitable links G and H, on the one hand, to the circular slide 7, which cuts off the low-pressure pipe, and, on the other hand, to the piston-slide 37, arranged in the cylinder $u$. The slide-box $z$ of the low-pressure pipe 6 communicates with the space 22 of the pressure-cylinder 4 by means of a pipe K. The cut-off devices 37, 38, and 34 are in the reversed order to that shown in Fig. 8; but this fact has no influence on the action of the arrangement as a whole. The pressure-cylinder itself is carried by columns L, and the working stamp 9 of the piston is guided by a slide or cross-head M, moving, for instance, along the said columns. The stamp 9 can, however, be movable in the slide M instead. In place of the conical valve 34 a piston-slide is also used. The chambers $w$ and $g$ of the two cut-off devices 38 and 34 may be connected to each other by bolts N. The exhaust-pipe 10 leads directly into the low-pressure pipe 6 or into the slide-box $z$, so that no waste of water can occur. The action of this practical example is, however, exactly the same as that of the form of construction shown in Fig. 8. Should the pressure-piston 5 require to be moved downward onto a piece of work, then is lever 11 in Fig. 10 moved so far downward that the controlling device 19 joins the pipes 20 and 10. Through this motion of lever 11 an opposed movement of the slides $x$ and $y$ takes place at the same time. By this motion the former of these slides has not as yet opened valve 16, while slide $y$ still holds valve 17 partly open. From the bottom of the pressure-cylinder 4 the water now pours into the low-pressure pipe 6 through pipes 20 and 10. At the same time the cylinder-space 22 becomes filled with low-pressure water from low-pressure conduit 6. Should lever 11 be moved still farther downward, pipes 20 and 10 will still be joined; but valve 17 will be free, so that it can be closed, and valve 16 will be opened by slide $x$. The high-pressure water from high-pressure pipe 12 is issued through pipe 14, valve 16, channel 23, pipes 24 25, cylinder $w$, and pipes 28 into the space above the piston 37 and pushes this piston 37 downward, so that the low-pressure pipe 6 will be shut off through the cut-off device 7 toward cylinder-space 22, while the pipes 25 32 will be joined together by the recess in piston 37. The high-pressure water can now pass from pipe 24, through pipe 25, into pipe 32 and from there reach the cylinder-space above the double piston 38 34 and press the latter downward. When this has happened, then the pipes 26 and 28 are closed from each other, whereas pipes 14 and 36, through channel 13 of cylinder $g$, are joined together. The high-pressure water will now reach cylinder-space 22 above the pressure-piston 5 through conduits 12 14, through the pipe 36, and effects there the necessary pressure; but should the piston require to be moved back, as in the designated place of Fig. 10$^a$, then will also the lever 11 be placed as in Fig. 10. Hereby takes place a shutting off of pipes 10 and 20, a closing of the valve 16, and an opening of the valve 17. The upper part of the double pistons 38 34 becomes pressure free, for the high-pressure water above the same can pass to the low-pressure pipe 6, through pipe 32, cylinder $u$, pipes 25 24, channel 23, valve 17, and pipe 10. The high-pressure water coming through channel 13 and working on the lower working end of this double piston 38 moves the same back in the designated position of Fig. 10, so that pipes 14 and 36 are closed against each other and pipes 26 28 are opened toward each other. Hereby is also the upper part of piston 37 pressure free, as the high-pressure water over the same can pass into the low-pressure pipe 6 through pipes 26 28 24, channel 23, valve 17, and pipe 10. Piston 37 is now pushed back in position (designated on Fig. 10$^a$) by the high-pressure water coming through pipe 14, so that the pipes 25 32 are closed against each other, while a downward motion of the cut-off device 7 has taken place and which causes an opening of the low-pressure pipe 6. If now lever 11 is moved upward, valve 17 opens farther without producing any result, however; but through the moving of the cutoff device 19 pipes 15 20 are placed in communication with each other, so that the high-pressure water passes from pipes 12 14 through pipe 15, cut-off device 19, and pipe 20, and in the cylinder-space below the pressure-piston and moves the pressure-piston to the designated position of Fig. 10ᵃ, as intended. At the same time the pressure-water in cylinder-space 22 is forced back through pipe k in the low-pressure pipe 6.

In a copending application filed June 20, 1902, Serial No. 112,550, I have claimed a method for accomplishing the results produced by this machine.

Having thus described my invention, what I claim, and desire to secure by Letters Patent, is—

1. In a device of the class described, the combination with a pressure-cylinder, a piston 5, a low-pressure supply, a high-pressure supply, and a controlling-lever 11; of a return control formed by a controlling device 19 initiating the upward and downward movement of the pressure-piston 5 and connected with the controlling-lever 11, an advance control formed by two controlling-valves 16, 17, directly operated by the controlling-lever, a high-pressure control formed by the controlling-valve 27, piston 33, valve 34 and lever 35, and a low-pressure control formed by controlling-valve 7, and its piston, the valve 31 and means connecting said valves for coöperation, the two latter acting in the required time and order, according to the upward or downward movement of the pressure-piston by the advance-control valves 16, 17.

2. In a device of the class described, the combination with a pressure-cylinder, a piston 5, a low-pressure supply, a high-pressure supply, and a controlling-lever 11; of a return control formed by a controlling device 19 initiating the upward and downward movement of the pressure-piston 5, and connected with the controlling-lever 11, an advance control formed by two controlling-valves 16, 17, directly operated by the controlling-lever, a high-pressure control formed by the controlling-valve 27, piston 33, valve 34, and lever 35, a low-pressure control formed by controlling-valve 7, and its piston, and the valve 31, said controlling-valves 7 and 31 being arranged side by side and connected to each other by a rocking lever so that said controlling-valve 31 is positively moved by the controlling-valve 7, and the valve 31 and rocking lever acting in the required time and order, according to the upward or downward movement of the pressure-piston by the advance-control valves 16, 17.

3. In a device of the class described, the combination with a pressure-cylinder and a piston, of a high-pressure supply leading to both sides of the cylinder, a low-pressure supply leading to one side of the cylinder only, a controlling device for controlling the low-pressure supply, controlling devices for controlling the high-pressure supply to both sides of the cylinder, connections between the high-pressure-controlling devices and the low-pressure-controlling device, and a single lever and connections between the same and the controlling devices, said controlling devices and connections comprising provision by virtue of which the low-pressure-controlling device closes before the high-pressure-controlling devices open and vice versa.

4. In a device of the class described, the combination with a pressure-cylinder and a piston, of a high-pressure supply leading to both sides of the cylinder, a low-pressure supply leading to one side of the cylinder only, a controlling device for controlling the low-pressure supply, controlling devices for controlling the high-pressure supply, both the controlling means operated by the high-pressure supply, connections between the low-pressure-controlling means and the high-pressure-controlling means, permitting the operation of the high-pressure-controlling means, after the low-pressure-controlling means for movement of the piston in one direction and vice versa, for movement of piston in the other direction.

5. In a device of the class described, the combination with a pressure-cylinder, and a piston; of a high-pressure supply having a branch leading to the upper part of the pressure-cylinder, and a branch leading to the lower part of said cylinder; a low-pressure supply leading to the upper part of the cylinder; a fluid-operated controlling means for controlling the low-pressure supply; fluid-operated controlling means for controlling the high-pressure supply leading to the upper part of the cylinder; connections from the high-pressure supply to the low-pressure-controlling device to open it, and to the high-pressure-controlling device to close it; controlling means 16, 19 in the high-pressure supply which leads to the lower part of the pressure-cylinder and to the low-pressure-controlling device; supply-pipes from the controlling means 16 and the low-pressure-controlling means to the high-pressure-controlling means of the branch which leads to the upper part of the pressure-cylinder to connect the low-pressure-controlling device and the high-pressure-controlling device, said connections permitting the high-pressure-controlling device to open only after the low-pressure-controlling device is closed or the low-pressure-controlling device to open only after the high-pressure-controlling device is closed.

6. In a device of the class described, the combination with a pressure-cylinder and a piston; of a high-pressure supply having a branch leading to the upper part of the pressure-cylinder, and a branch leading to the lower part of said cylinder; a low-pressure supply leading to the upper part of the cylinder; a fluid-operated controlling means for controlling the low-pressure supply; fluid-operated controlling means for controlling the high-pressure supply leading to the upper part of the cylinder; connections from the high-pressure supply to the low-pressure-controlling device to open it, and to the high-pressure-controlling device to close it; controlling means 16, 19, in the high-pressure supply which leads to the lower part of the pressure-cylinder and to the low-pressure-controlling device; supply-pipes from the controlling means 16 and the low-pressure-controlling means to the high-pressure-controlling means of the branch which leads to the upper part of the pressure-cylinder, to connect the low-pressure-controlling device and the high-pressure-controlling device said connections permitting the high-pressure-controlling device to open only after the low-pressure-controlling device is closed or the low-pressure-controlling device to open only after the high-pressure-controlling device is closed; and a means permitting the fluid to flow from the controlling-means supply.

7. In a device of the class described, the combination, with a pressure-cylinder, and a piston, of a high-pressure supply having a branch leading to the upper part of the pressure-cylinder, and a branch leading to the lower part of said cylinder; a low-pressure supply leading to the upper part of the cylinder; fluid-operated controlling means for controlling the low-pressure supply; fluid-operated controlling means for controlling the high-pressure supply leading to the upper part of the cylinder; connections from the high-pressure supply to the low-pressure-controlling device to open it, and to the high-pressure-controlling device to close it; controlling means 16, 19 in the high-pressure supply which leads to the lower part of the pressure-cylinder and to the low-pressure-controlling device; supply-pipes from the controlling means 16 and the low-pressure-controlling means to the high-pressure-controlling means of the branch which leads to the upper part of the pressure-cylinder, to connect the low-pressure-controlling device and the high-pressure-controlling device, said connections permitting the high-pressure-controlling device to open only after the low-pressure-controlling device is closed or the low-pressure-controlling device to open only after the high-pressure-controlling device is closed; a means permitting the fluid to flow from the controlling-means supply, and a single lever shiftable to various positions operating, in predetermined order, the high-pressure-controlling device that controls the supply to the low end of the pressure-cylinder, the controlling device 16, and the means which permits the fluid in the controlling-means supply to flow out.

In witness whereof I have hereunto set my hand in presence of two witnesses.

WILAND ASTFALCK.

Witnesses:
 HENRY HASPER,
 WOLDEMAR HAUPT.